United States Patent

Murphy et al.

(10) Patent No.: US 8,560,639 B2
(45) Date of Patent: Oct. 15, 2013

(54) DYNAMIC PLACEMENT OF REPLICA DATA

(75) Inventors: Elissa E. S. Murphy, Seattle, WA (US);
Yan V. Leshinsky, Bellevue, WA (US);
John D. Mehr, Kenmore, WA (US)

(73) Assignee: Microsoft Corporation, Redmond, WA (US)

(\*) Notice: Subject to any disclaimer, the term of this patent is extended or adjusted under 35 U.S.C. 154(b) by 253 days.

(21) Appl. No.: 12/430,018

(22) Filed: Apr. 24, 2009

(65) Prior Publication Data

US 2010/0274762 A1 Oct. 28, 2010

(51) Int. Cl.
*G06F 15/16* (2006.01)
*G06F 15/173* (2006.01)
*G06F 17/00* (2006.01)

(52) U.S. Cl.
USPC ............ 709/219; 709/223; 707/610; 707/634

(58) Field of Classification Search
USPC ......................................................... 709/219
See application file for complete search history.

(56) References Cited

U.S. PATENT DOCUMENTS

| | | | |
|---|---|---|---|
| 5,239,647 A | | 8/1993 | Anglin et al. |
| 5,410,671 A | * | 4/1995 | Elgamal et al. ............... 711/202 |
| 5,701,480 A | | 12/1997 | Raz |
| 5,924,096 A | | 7/1999 | Draper et al. |
| 5,987,506 A | | 11/1999 | Carter |
| 6,167,427 A | * | 12/2000 | Rabinovich et al. .......... 709/201 |
| 6,256,675 B1 | * | 7/2001 | Rabinovich .................... 709/241 |
| 6,405,219 B2 | | 6/2002 | Saether |
| 6,463,454 B1 | * | 10/2002 | Lumelsky et al. ............. 709/226 |
| 6,466,980 B1 | * | 10/2002 | Lumelsky et al. ............. 709/226 |
| 6,516,350 B1 | * | 2/2003 | Lumelsky et al. ............. 709/226 |
| 6,728,849 B2 | | 4/2004 | Kodama |
| 6,785,786 B1 | | 8/2004 | Gold et al. |
| 6,880,002 B2 | | 4/2005 | Hirschfeld et al. |

(Continued)

FOREIGN PATENT DOCUMENTS

| | | |
|---|---|---|
| JP | 06259308 A | 9/1994 |
| JP | 2004046874 A * | 12/2004 |

(Continued)

OTHER PUBLICATIONS

Feng Mao; Hai Jin; Deqin Zou; Baoli Chen; Li Qi; , "QoS oriented dynamic replica cost model for P2P computing," Distributed 25 th IEEE International Conference on Computing Systems Workshops, Jun. 6-10, 2005 pp. 822-828.*

(Continued)

*Primary Examiner* — David Lazaro
*Assistant Examiner* — Robert Shaw
(74) *Attorney, Agent, or Firm* — Shook, Hardy & Bacon L.L.P.

(57) ABSTRACT

The claimed subject matter relates to systems and/or methodologies that facilitate distributed storage of data. A distributed file system can be implemented on storage nodes such that the system places multiple copies of data (e.g., replicas) on a variety of disparate storage nodes to guarantee availability of the data and minimize loss of the data. Storage nodes are dynamically evaluated to identify respective characteristics. In one example, the characteristics can include availability of a storage node, capacity of a storage node, data storage cost associated with a storage node, data transfer costs associated with a storage node, locality of a storage node, network topology, or user preferences associated with a storage node. The characteristics can be employed to generate optimal placements decisions.

11 Claims, 10 Drawing Sheets

(56) References Cited

U.S. PATENT DOCUMENTS

| | | |
|---|---|---|
| 6,950,871 B1 | 9/2005 | Honma et al. |
| 7,020,665 B2 | 3/2006 | Douceur et al. |
| 7,023,974 B1* | 4/2006 | Brannam et al. ............ 379/93.24 |
| 7,054,910 B1* | 5/2006 | Nordin et al. ................. 709/208 |
| 7,103,740 B1 | 9/2006 | Colgrove et al. |
| 7,136,903 B1 | 11/2006 | Phillips et al. |
| 7,155,463 B1* | 12/2006 | Wang et al. ................... 707/634 |
| 7,219,191 B2 | 5/2007 | Takamoto et al. |
| 7,334,062 B1 | 2/2008 | Agarwal et al. |
| 7,370,336 B2 | 5/2008 | Husain et al. |
| 7,383,381 B1 | 6/2008 | Faulkner et al. |
| 7,392,421 B1 | 6/2008 | Bloomstein et al. |
| 7,461,230 B1 | 12/2008 | Gupta et al. |
| 7,529,785 B1* | 5/2009 | Spertus et al. ......................... 1/1 |
| 7,653,668 B1* | 1/2010 | Shelat et al. ................... 707/610 |
| 7,657,582 B1 | 2/2010 | Cram et al. |
| 7,685,109 B1 | 3/2010 | Ransil et al. |
| 7,693,877 B1 | 4/2010 | Zasman |
| 7,739,233 B1* | 6/2010 | Ghemawat et al. ........... 707/610 |
| 7,761,456 B1 | 7/2010 | Cram et al. |
| 7,783,600 B1* | 8/2010 | Spertus et al. ................. 707/622 |
| 7,805,407 B1 | 9/2010 | Verbeke et al. |
| 7,827,214 B1* | 11/2010 | Ghemawat et al. ........... 707/822 |
| 7,836,017 B1* | 11/2010 | Srinivasan et al. ........... 707/634 |
| 7,925,623 B2 | 4/2011 | Therrien et al. |
| 7,941,619 B1* | 5/2011 | Rossi ............................. 711/162 |
| 2001/0027467 A1* | 10/2001 | Anderson et al. ............. 709/201 |
| 2002/0055972 A1 | 5/2002 | Weinman, Jr. |
| 2002/0107877 A1 | 8/2002 | Whiting et al. |
| 2002/0156974 A1 | 10/2002 | Ulrich et al. |
| 2003/0056139 A1 | 3/2003 | Murray et al. |
| 2003/0105810 A1* | 6/2003 | McCrory et al. .............. 709/203 |
| 2003/0110263 A1 | 6/2003 | Shillo |
| 2003/0135514 A1 | 7/2003 | Patel et al. |
| 2003/0167295 A1* | 9/2003 | Choo ............................. 709/104 |
| 2003/0177176 A1* | 9/2003 | Hirschfeld et al. ........... 709/203 |
| 2003/0212872 A1 | 11/2003 | Patterson |
| 2004/0003107 A1* | 1/2004 | Barham et al. ................ 709/235 |
| 2004/0030731 A1 | 2/2004 | Iftode et al. |
| 2004/0047354 A1* | 3/2004 | Slater et al. ................... 370/400 |
| 2004/0049700 A1* | 3/2004 | Yoshida ......................... 713/201 |
| 2004/0064633 A1 | 4/2004 | Oota |
| 2004/0088331 A1* | 5/2004 | Therrien et al. .............. 707/200 |
| 2004/0122741 A1 | 6/2004 | Sidman |
| 2004/0193659 A1 | 9/2004 | Carlson |
| 2004/0210591 A1* | 10/2004 | Hirschfeld et al. ........... 707/100 |
| 2005/0108565 A1* | 5/2005 | Blea et al. ..................... 713/200 |
| 2005/0120058 A1 | 6/2005 | Nishio |
| 2005/0132257 A1* | 6/2005 | Gold et al. ....................... 714/47 |
| 2005/0144195 A1* | 6/2005 | Hesselink et al. ............ 707/201 |
| 2005/0154697 A1 | 7/2005 | Altaf et al. |
| 2005/0193239 A1 | 9/2005 | Shackelford |
| 2005/0246398 A1 | 11/2005 | Barzilai |
| 2005/0262097 A1* | 11/2005 | Sim-Tang et al. .............. 707/10 |
| 2005/0283487 A1 | 12/2005 | Karlsson et al. |
| 2006/0010169 A1 | 1/2006 | Kitamura |
| 2006/0064416 A1 | 3/2006 | Sim-Tang |
| 2006/0149901 A1 | 7/2006 | Sasage et al. |
| 2006/0161635 A1 | 7/2006 | Lamkin et al. |
| 2006/0168154 A1* | 7/2006 | Zhang et al. .................. 709/220 |
| 2006/0179061 A1 | 8/2006 | D'ZSouza et al. |
| 2006/0190243 A1 | 8/2006 | Barkai et al. |
| 2006/0230076 A1* | 10/2006 | Gounares et al. ............. 707/200 |
| 2006/0242155 A1 | 10/2006 | Moore et al. |
| 2006/0253504 A1* | 11/2006 | Lee et al. ...................... 707/203 |
| 2006/0265490 A1* | 11/2006 | Pishevar et al. ............... 709/223 |
| 2006/0271530 A1* | 11/2006 | Bauer ............................... 707/5 |
| 2006/0271601 A1* | 11/2006 | Fatula et al. .................. 707/201 |
| 2007/0027916 A1* | 2/2007 | Chen et al. .................. 707/104.1 |
| 2007/0043787 A1 | 2/2007 | Cannon |
| 2007/0079004 A1 | 4/2007 | Tatemura et al. |
| 2007/0083725 A1* | 4/2007 | Kasiolas et al. ............... 711/165 |
| 2007/0094269 A1 | 4/2007 | Mikesell et al. |
| 2007/0113032 A1 | 5/2007 | Kameyama et al. |
| 2007/0136541 A1 | 6/2007 | Herz et al. |
| 2007/0143371 A1* | 6/2007 | Kottomtharayil ............. 707/204 |
| 2007/0207729 A1 | 9/2007 | Chen et al. |
| 2007/0208748 A1* | 9/2007 | Li .................................... 707/10 |
| 2007/0244894 A1 | 10/2007 | St. Jacques |
| 2007/0244920 A1 | 10/2007 | Palliyil et al. |
| 2007/0245103 A1 | 10/2007 | Lam et al. |
| 2007/0250519 A1* | 10/2007 | Fineberg et al. .............. 707/100 |
| 2007/0294719 A1 | 12/2007 | Jost |
| 2008/0005334 A1 | 1/2008 | Utard et al. |
| 2008/0052328 A1 | 2/2008 | Widhelm |
| 2008/0065704 A1 | 3/2008 | MacCormick et al. |
| 2008/0104107 A1 | 5/2008 | Schwaab et al. |
| 2008/0147836 A1 | 6/2008 | Littlefield et al. |
| 2008/0177873 A1* | 7/2008 | Ni et al. ........................ 709/223 |
| 2008/0178179 A1 | 7/2008 | Natarajan et al. |
| 2008/0198752 A1 | 8/2008 | Fan et al. |
| 2008/0209144 A1 | 8/2008 | Fujimoto |
| 2008/0215663 A1 | 9/2008 | Ushiyama |
| 2008/0222154 A1* | 9/2008 | Harrington et al. ............. 707/10 |
| 2008/0222346 A1 | 9/2008 | Raciborski et al. |
| 2008/0235331 A1 | 9/2008 | Melamed et al. |
| 2008/0256138 A1 | 10/2008 | Sim-Tang |
| 2008/0301132 A1* | 12/2008 | Yamada et al. ..................... 707/5 |
| 2009/0007241 A1 | 1/2009 | Tewari |
| 2009/0164533 A1 | 6/2009 | Hubbard |
| 2009/0182955 A1 | 7/2009 | Cherukuri |
| 2009/0222498 A1 | 9/2009 | Lu et al. |
| 2009/0234917 A1 | 9/2009 | Despotovic et al. |
| 2009/0276771 A1* | 11/2009 | Nickolov et al. ............. 717/177 |
| 2009/0292871 A1 | 11/2009 | Watanabe et al. |
| 2009/0300079 A1 | 12/2009 | Shitomi |
| 2010/0023722 A1* | 1/2010 | Tabbara et al. ............... 711/170 |
| 2010/0034211 A1 | 2/2010 | Yanagihara |

FOREIGN PATENT DOCUMENTS

| | | |
|---|---|---|
| JP | 200701840 A | 1/2007 |
| JP | 2007018407 A * | 1/2007 |
| WO | WO2007088084 | 8/2007 |

OTHER PUBLICATIONS

Ranganathan and Foster, Identifying Dynamic Replication Strategies for a High-Performance Data Grid, LNCS 2242, Springer-Verlag, 2001, pp. 75-86.*

LoPresti et al., Dynamic Replica Placement in Content Delivery Networks, Proceedings of the 13th IEEE International Symposium on Modeling, Analysis, and Simulation of Computer and Telecommunication Systems (MASCOTS'05), 2005.*

Karlsson and Karamanolis, Choosing Replica Placement Heuristics for Wide-Area SystemProceedings of the 24th International Conference on Distributed Computing Systems (ICDCS'04), IEEE, 2004.*

Ye and Chiu, Peer-to-Peer Replication with Preferences, Infoscale Jun. 6-8, 2007, Suzhou, China, ACM, 2007.*

On et al, "Quality of Availability: Replica Placement for Widely Distributed Systems", Proceedings of the 11th international conference on Quality of service (IWQoS2003), Lecture Notes in Computer Science 2707 Springer-Verlag (2003), pp. 324-352.*

Androutsellis-Theotokis and Spinellis, A Survey of Peer-to-Peer Content Distribution Technologies, ACM Computing Surveys, vol. 36, No. 4, Dec. 2004, pp. 335-371.*

Rabin, "Efficient dispersal of information for security, load balancing, and fault tolerance", Journal of the Association for Computing Machinery. vol. 36, No. 2, Apr. 1989, pp. 335-348.*

Loukopoulos and Ahmad, "Static and adaptive distributed data replication using genetic algorithms" in Journal of Parallel Distributed Computing 64 (2004) pp. 1270-1285.*

Karlsson and Karamanolis, "Choosing Replica Placement Heuristics for Wide-Area Systems" Proceedings of the 24th International Conference on Distributed Computing Systems (ICDCS'04), IEEE, 2004.*

Tang and Yang, Differentiated Object Placement for Self-Organizing Storage Clusters,UCSB, 2002.*

Ellard et al., Attribute-Based Prediction of File Properties, Tech. Report TR-14-03, Harvard University, Cambridge MA, 2004.*

(56) References Cited

OTHER PUBLICATIONS

Mao et al , "QoS oriented dynamic replica cost model for P2P computing," Distributed 25 th IEEE International Conference on Computing Systems Workshops, Jun. 6-10, 2005 pp. 822-828.*
On et al. "QoS-Controlled Dynamic Replication in Peer-to-Peer Systems", Proceedings of Third International Conference on Peer-to-Peer Computing, 2003.*
On et al, "Quality of Availability: Replica Placement for Widely Distributed Systems", Proceedings of the 11th international conference on Quality of service (IWQS2003), Lecture Notes in Computer Science 2707 Springer-Verlag (2003), pp. 324-352.*
Ripeanu and Foster, A Decentralized, Adaptive Replica Location Mechanism, Proceedings of the 11th IEEE International Symposium on High Performance Distributed Computing (HPDC-11), 2002.*
Chandy & Hewes, File Allocation in Distributed Systems, Proceedings of the 1976 ACM SIGMETRICS conference on Computer performance modeling measurement and evaluation, Cambridge, Mass (1976), pp. 10-13.*
Rabinovich et al—Dynamic Replication on the Internet, AT&T Research Report (Mar. 1998).*
Karlsson and Karamanolis, "Choosing Replica Placement Heuristics for Wide-Area Systems" Proceedings of the 24th International Conference on Distributed Computing Systems (ICDSC'04), IEEE, 2004.*
Karlsson and Karamanolis, "Bounds on the Replication Cost for QoS" Technical report HPL-2003-156, Hewlett Packard Labs, Jul. 2003.*
Casey, Allocation of a file in an information network, AFIPS '72, ACM (Spring, 1972), pp. 617-625.*
Ranganathan et al. Improving Data Availability through Dynamic Model-Driven Replication in Large Peer-to-Peer Communities, Proceedings of the 2nd IEEE/ACM International Symposium on Cluster Computing and the Grid (CCGRID.02), 2002.*
Ranganathan and Foster, "Identifying Dynamic Replication Strategies for a High-Performance Data Grid", LNCS 2242, Springer-Verlag, 2001, pp. 75-86.*
Kangasharju, Ross & Turner—Adaptive content management in Structured P2P Communities, International Conference on Scalable Information Systems, Hong Kong (2006).*
Tierney et al "A Monitoring Sensor Management System for Grid Environments", Cluster Computing No. 4, 2001 pp. 19-28.*
Xiao et al , Distributed Proximity-Aware Peer Clustering in BitTorrent-Like Peer-to-Peer Networks, in: EUC 2006, LNCS 4096, SpringerLink (2006) pp. 375-384.*
Karlsson et al A Framework for Evaluating Replica Placement Algorithms HP Technical Report HPL-2002-219 (Aug. 2002).*
Mahmoud and J. Riordon, "Optimal Allocation of Resources in Distributed Information Networks", ACM Transactions on Database Systems, Mar. 1976, pp. 66-78.*
Tewari & Adam, Distributed File Allocation with Consistency Constraints, IEEE, Proceedings of the International Conference on Distributed Computing (1992), pp. 408-415.*
Dowdy and Foster, Comparative Models of the File Assignment Problem, Computing Surveys, vol. 14, No. 2, ACM, Jun. 1982, 287-313.*
Chu, Optimal File Allocation in a Multiple Computer, IEEE Transactions on Computers, vol. C-18, No. 10, Oct. 1969, 885-889.*
Zhipeng & Dan, Dynamic Replication Strategies for Object Storage Systems in: EUC Workshops 2006, LNCS 4097, SpringerLink (2006) pp. 53-61.*
Yi and Chiu, Peer-to-Peer Replication with Preferences, Infoscale 2007, ACM (2007).*
Oracle, Oracle Database Backup in the Cloud, http://www.oracle.com/technology/tech/cloud/pdf/cloud-backup-whitepaper.pdf, 12 pages, Sep. 2008.
Kaczmarski, Jiang & Pease, "Beyond backup toward storage management", IBM Systems Journal, vol. 42, No. 2, 2003, pp. 322-337.
Tang & Yang, Differentiated Object Placement for Self-Organizing Storage Clusters, Technical Report 2002-32, UCSB, (Nov. 2002).

Tang et al—Sorrento: A Self-Organizing Storage Cluster for Parallel Data-Intensive Applications, Technical Report 2003-30, UCSB, (2003).
L. Qiu, V. Padmanabhan, and G. Voelker. On the Placement of Web Server Replicas. In Proceedings of IEEE Infocom, Apr. 2000, pp. 1587-1596.
Dilley et al. "Globally Distributed Content Delivery", IEEE Internet Computing, IEEE (Sep.-Oct. 2002) p. 50-58.
Phan et al. "Evolving Toward the Perfect Schedule: Co-scheduling Job Assignments and Data Replication in Wide-Area Systems Using a Genetic Algorithm," 11th Workshop on Job Scheduling Strategies for Parallel Processing, Cambridge Mass., Jun. 2005.
Zhao et al., Tapestry: An Infrastructure for Fault-tolerant Wide Area Location and Routing, Report No. UCB/CSD-1-1141, Apr. 2001.
Weatherspoon et al., Introspective Failure Analysis: Avoiding Correlated Failures in Peer-to-Peer Systems, IEEE (2002).
Sanchez-Artigas et al., "A Comparative Study of Hierarchical DHT Systems" in: 32nd IEEE Conference on Local Computer Networks, IEEE (2007).
L. Garces-Ercie et al. "Hierarchical P2P Systems," ACM/IFIP Conference on Parallel and Distributed Computing (Euro-Par), 2003.
J. Kangasharju, K.W. Ross, and D.A. Turner, Optimal Content Replication in P2P Communities, 2002.
Jorden, E., Project Prioritization and Selection: The Disaster Scenario, In Proceedings of the 32nd Annual Hawaii International Conference on Systems Sciences (HICSS-32) Maui, Hawaii, Jan. 1999.
Abawajy, Placement of File Replicas in Data Grid Environment ICCS 2004, LNCS 3038, Springer-Verlag, 2004, pp. 66-73.
Stockinger, H., Samar, A., Allcock, B. Foster, I., Holtman, K., Tierney, B.: File and Object Replication in Data Grids 10th IEEE Symposium on High Performance and Distributed Computing (2001).
Hoschek, W., Janez, F.J. Samar, A., Stockinger, H., Stockinger, K.: Data Management in an International Data GRID Project, Proceedings of Grid Workshop (2000) 77-90.
Translation of KP 20050201248-A, Ichikawa, Hiroyuk (Jan. 2007).
Dimakis et al., Nortwork Cording for Distributed System (Mar. 2008).
Szymaniak et al, "Latency-Driven Replica Placement", IPSJ Journal, (Aug. 2006) source: http://www.globule.org/publi/LDRP.ipsj006.html
Compellent Technologies Inc. Datasheet of Data Progression Storage Center, 2008, http://www.mgbsinc.com/ NEWSITEFILES/Compellent/MGBS-Compellent-DataProgression-2008.pdf.
Final Office Action mailed Mar. 26, 2012 U.S. Appl. No. 12/430,015; 70 pages.
Office Action mailed Jun. 21, 2011 U.S. Appl. No. 12/430,015; 83 pages.
Office Action mailed Jul. 25, 2011 U.S. Appl. No. 12/430,010; 69 pages.
PCT Application No. PCT/US2010/031942 International Preliminary Report on Patentability dated Oct. 25, 2011; 5 pages.
Final Office Action mailed Mar. 28, 2012 U.S. Appl. No. 12/430,010; 57 pages.
Office Action mailed May 26, 2011 U.S. Appl. No. 12/430,012; 89 pages.
Final Office Action mailed Apr. 13, 2012 U.S. Appl. No. 12/430,012; 72 pages.
PCT Application No. PCT/UC2010/031939 Search Report Dated Nov. 30, 2010; 4 pages.
PCT Application No. PCT/US2010/031939 Written Opinion dated Nov. 30, 2010; 5 pages.
PCT Application No. PCT/US2010/031939 International Preliminary Report on Patentability dated Oct. 25, 2011; 6 pages.
PCT Application No. PCT/US2010/031942 Written Opinion dated Nov. 8, 2010; 4 pages.
International Search Report with Written Opinion dated Nov. 8, 2010.
LoPresti, Dynamic Replica Placement in Content Delivery Netorks, Proceedings of the 13th IEEE International Symposium on Modeling, Analysis, and Simulation of Computer and Telecommunication Systems (2005).

(56) References Cited

OTHER PUBLICATIONS

Szymaniak et al, "Latency-Driven Replica Placement", IEEE International Symposium on Applications and the Internet (Feb. 2005).
Qiu, et al. On the Placement of Web Server Replicas, IEEE INFOCOM, 2001.
Zhipeng & Dan, Dynamic Replication Strategies for Object Storage Systems in: EUC Workshops 2006, LNCS 4097, SpringerLink (2006).
Tang & Yang, Technical Report 2002-32, UCSB, Nov. 2002.
Karlson et al., A Framework for Evaluating Replica Placement Algorithms, HP Tech Report PHL-2002-219 (Aug. 2002), 13 pages.
Bartolini et al. Optimal Dynamic Replica Placement in Content Delivery Networks, pp. 125-130 (6 pages).
Xiao et al., Distributed Proximity—Aware Peer Clustering in BioTorrent-Like Peer-to-Peer Networks, E. Sha et al. (eds.): EUC 2006, LNCS 4096, pp. 375-384, 2006.
Chandy et al., File Allocation in Distributed Systems, Joint International Conference on Measurement and Modeling of Computer Systems Proceedings of the 1976 ACM SIGMETRICS conference on Computer Performance Modeling Measurement and Evaluation, Cambridge, MA, 1976, pp. 10-13.
Rabinovich et al., Dynamic Replication on the Internet Work Project No. 3116-17-1706, AT&T Labs Research, p. 1-35.
Rabinovich et al., RaDaR: a scalable architecture for a global Web hosting service, Computer Networks 31 (1999) 1545-1561.
Casey, Allocation of a File in an Information Network, Proceedings of the May 16-18, 1972, Spring Joint Computer Conference (Atlantic City, NJ May 16-18, 1972). AFIPS '72 (Spring)m ACM, New York, NY, pp. 617-625.
Mahmoud, et al., Optimal Allocation of Resources in Distributed Information Networks, ACM Transactions on Database Systems, vol. 1, No. 1, Mar. 1976, pp. 66-78.
Karlsson et al. A Framework for Evaluating Replica Placement Algorithms, HP Tech Report HPL-2002-219 (Aug. 2002).
Ye & Chiu, Peer-to-Peer Replication with Preferences, InfoScale 2007, Jun. 6-8, 2007, Suzhou, China, ACM (2007).
Non-Final Office Action mailed Nov. 7, 2012, 504 pages.
Non-Final Office Action mailed Nov. 5, 2012 in U.S. Appl. No. 12/430,012; 452 pages.
Non-Final Office Action mailed Oct. 23, 2012 re U.S. Appl. No. 12/430,010, 454 pages.
Barr, et al., pStore: A Secure Distributed Backup System, http://kbarr.net/static/pstore/progress.pdf, 10 pages.
Distributed Version Control and Library Metadata, http://journal.code4lib.org/articles/86, last accessed Jan. 22, 2009, 9 pages.
Peer-to-Peer Replication, http://publib.boulder.ibm.com/infocenter/db2luw/v9r5/index.jsp?topic=/com.ibm.swg.im.iis.repl.qrepl.doc/topics/iiyrqsubcp2pconc.html, last accessed Jan. 22, 2009, 5 pages.
Auvray, Distributed Version Control Systems: A Not-So-Quick Guide Through, http://www.infoq.com/articles/dvcs-guide, last accessed Jan. 22, 2009, 18 pages.
Stefansson, MyriadStore: A Peer-to-Peer Backup System, http://myriadstore.sics.se/docs/mstorethesis.pdf, Jun. 2006, 86 pages.
Li, et al., Erasure Resilient Codes in Peer-to-Peer Storage Cloud, http://ieeexplore.ieee.org/stamp/stamp.jsp?arnumber=01660948 4 pages.
DFSgc: Distributed File System for Multipurpose Grid Applications and Cloud Computing, http://www.cyfronet.pl/cgw08/presentations/c2-4.pdf, 18 pages.
Harris, De-duplicating Primary Storage, http://storagemojo.com/2008/09/30/de-duplicating-primary-storage/, last accessed on Jan. 22, 2009 18 pages.
Graham, Cloud Optimized Storage Solutions: Neural Networks and Heuristics, http://flickerdown.com/2009/01/cloud-optimized-storage-solutions-neural-networks-and-heuristics/, Jan. 19, 2009, 10 pages.
Storage Optimization, http://storageoptimization.wordpress.com/, last accessed on Jan. 22, 2099 9 pages.
Backup, The New Storage Tiers and Real Snapshots, http://blogs.netapp.com/extensible_netapp/iops/index.html, Dec. 15, 2008, 5 pages.
Distributed Backup Solution for Corporate Networks, http://www.handybackup.net/distributed-backup-system.shtml, last accessed on 1-22-099 2 pages.
Douceour, Large-scale Simulation of Replica Placement Algorithms for a Sewerless Distributed File System, http://ieeexplore.ieee.org/stamp/stamp.jsp?arnumber=948882&isnumber=20512, Jan. 22, 2009, 10 pages.
McCue, et al., Computing Replica Placement in Distributed Systems, http://ieeexplore.ieee.org/stamp/stamp.jsp?arnumber=242617&isnumber=6238, Jan. 22, 2009, 4 pages.
MacCormick, et al., Kinesis: A New Approach to Replica Placement in Distributed Storage Systems, http://research.microsoft.com/pubs/76149/Kinesis.pdf, 14 pages.
Yu, et al., Minimal Replication Cost for Availability, http://www.comp.nus.edu.sg/~yuhf/podc02.pdf, 10 pages.
Chen, et al. SCAN: A Dynamic, Scalable, and Efficient Content Distribution Network, http://sahara.cs.berkeley.edu/papers/CKKO2b.ps, 15 pages.
Presti, et al. Dynamic Replica Placement in Content Delivery Networks, http://ieeexplore.ieee.org/stamp/stamp.jsp?arnumber=01521155, 10 pages.
Chun, et al. Efficient Replica Maintenance for Distributed Storage Systems, http://oceanstore.cs.berkeley.edu/publications/papers/pdf/carbonite06.pdf, 14 pages.

* cited by examiner

DYNAMIC PLACEMENT OF REPLICA DATA

BACKGROUND

As computing devices become more prevalent and widely used among the general population, the amount of data generated and utilized by such devices has rapidly increased. For example, recent advancements in computing and data storage technology have enabled even the most limited form-factor devices to store and process large amounts of information for a variety of data-hungry applications such as document editing, media processing, and the like. Further, recent advancements in communication technology can enable computing devices to communicate data at a high rate of speed. These advancements have led to, among other technologies, the implementation of distributed computing services that can, for example, be conducted using computing devices at multiple locations on a network. In addition, such advancements have enabled the implementation of services such as network-based storage, which allow a user of a computing device to maintain one or more copies of data associated with the computing device at a remote location on a network.

Existing system and/or data storage solutions enable a user to store information in a location and/or media separate from its original source. Thus, for example, data from a computing device can be replicated from a hard drive to external media such as a tape drive, an external hard drive, or the like. However, in an implementation of network-based storage and/or other solutions that can be utilized to provide physically remote locations for storing data, costs and complexity associated with transmission and restoration of user data between a user machine and a remote storage location can substantially limit the usefulness of a system.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methodologies that facilitate distributed storage of data. A distributed file system can be implemented on storage nodes such that the system places multiple copies of data (e.g. replicas) on a variety of disparate storage nodes to guarantee availability of the data and minimize loss of the data. Placement and number of replicas can be selected to satisfy availability and durability requirements. In addition, placement decisions can be optimized to reduce costs (e.g., storage costs, bandwidth costs, latency costs, etc.).

In accordance with one aspect, storage nodes are dynamically evaluated to identify respective characteristics. In one example, the characteristics can include availability of a storage node, capacity of a storage node, data storage cost associated with a storage node, data transfer costs associated with a storage node, locality of a storage node, network topology, user preferences associated with a storage node, facilitate selection of a replica requirement. The characteristics can be employed to generate optimal placements decisions. In addition, the characteristics can utilized to support dynamic real-location of replica placement.

In accordance with another aspect, a hybrid backup architecture can be supported through distributed storage techniques described herein. In the hybrid backup architecture, backup data can be retained on a global location within a network or internetwork (e.g., a "cloud") as well as one or more peers. Accordingly, some or all backup data can be obtained from either the cloud or a nearby peer, thus reducing latency and bandwidth consumption associated with restore operations. In one example, selection of locations to be utilized for storing and/or retrieving backup data can be selected in an intelligent and automated manner based on factors such as, but not limited to, availability of locations, network topology, location resources, or so on.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
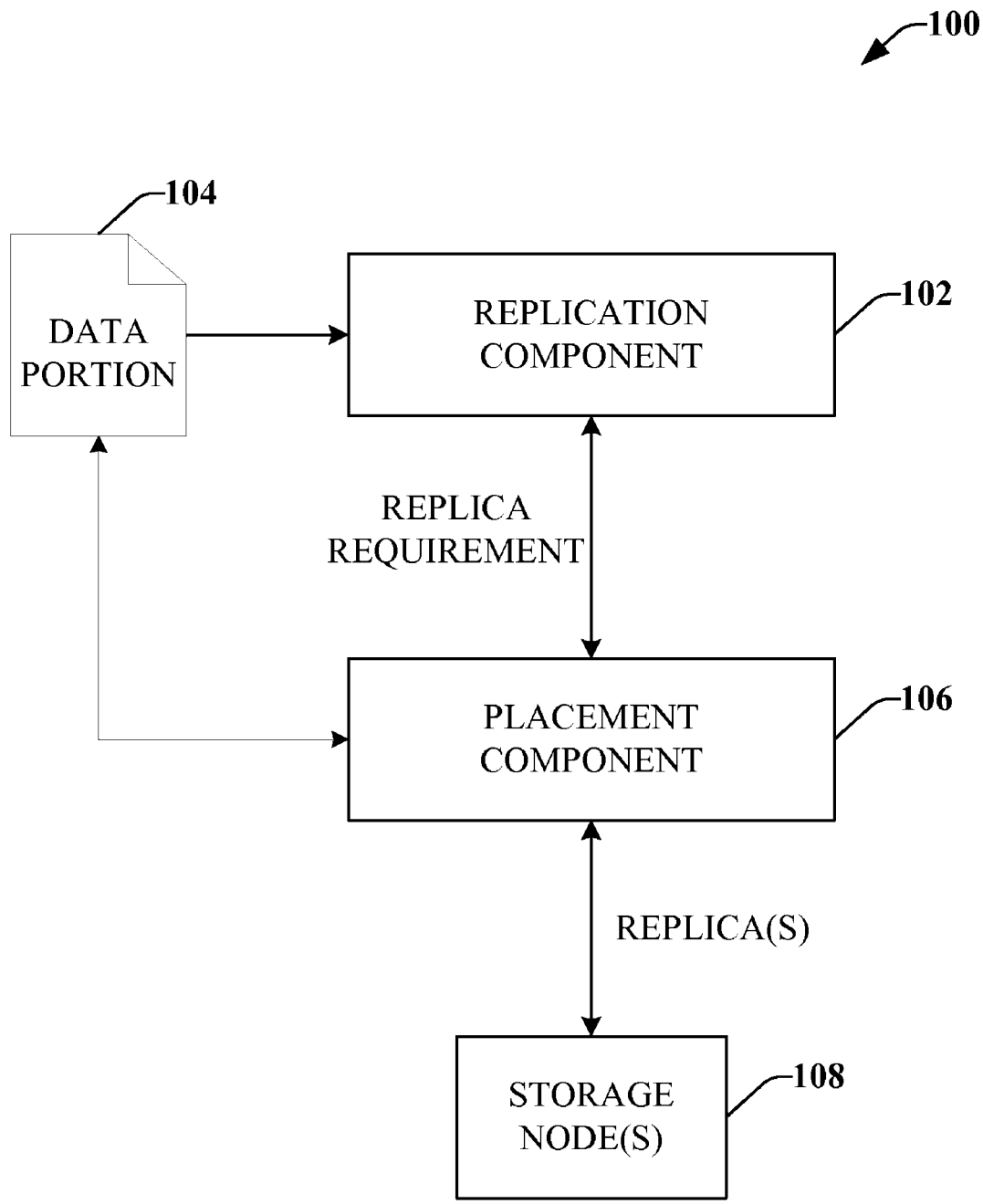
FIG. 1 illustrates a block diagram of an example system that facilitates distributed placement of replica data among a set of storage nodes in accordance with various aspects.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "cloud," "peer," "super peer," "client," and the like are intended to refer to a computer-related entity, either hardware, software in execution on hardware, and/or firmware. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Now turning to the figures, FIG. 1 illustrates a system 100 that facilitates distributed placement of replica data among a set of storage nodes in accordance with various aspects. In one example, system 100 can be utilized to implement a distributed file system that places copies files, system images and/or other data on multiple machines. In an aspect, the machines can be a personal computer, a laptop computer, a server, a portable digital assistant (PDA), a mobile device, a smart phone, a cell phone, a portable gaming device, a media player or any other suitable computing device that can store, manipulate and/or transfer data.

In accordance with one aspect, system 100 can be utilized in connection with a network-based or online backup solution (e.g., a cloud backup system, as described in further detail infra) that stores backup information from a client machine at one or more remote storage locations on a network or internetwork to which the client machine is associated. Conventional online backup solutions operate by maintaining a set of files obtained from a backup client at various points in the time at a remote storage location. Subsequently, restoration is conducted by retrieving one or more files from the storage locations as requested.

To guarantee availability of data and/or prevent data loss, system 100 can facilitate distributed storage of data across a set of storage nodes 108. The set of storage nodes 108 can include client machines (e.g., personal computers, laptops, etc.), servers, mobile devices, network storage devices, cloud storage locations, and/or any other suitable storage devices accessible in a distributed environment. More particularly, when a user, on a client machine, desires to reliably store data, such as data portion 104, a replication component 102 can be employed to generate a replica requirement to satisfy availability, durability and/or redundancy standards. The replica requirement can be a parameter that specifies a total number of replicas of data portion 104 to disperse among storage nodes 108. In one example, the replication component 102 can identify the replica requirement based upon characteristics of the storage nodes 108. Characteristics of a storage node can include features such as, but not limited to, availability of the storage node, storage capacity of the storage node, cost of storage on the storage nodes, cost of transfer to/from the storage node, network proximity and/or locality of the storage node relative to an origin node, and network topology and so on. Such characteristics can be dynamically evaluated individually for each storage node 108 by the replication component 102. It is to be appreciated that such evaluation and/or reevaluation can be ongoing such that historical and/or statistical information on characteristics of nodes is maintained over a period of time to facilitate intelligent determination of replica requirements.

In another aspect, upon generating of a replica requirement that reflects a number of replicas to be dispersed, a placement component 106 can be employed to replicate the data portion 104 across one or more storage nodes 108 in accordance with the replica requirement. In one example, the replica requirement can indicate that three replicas or copies of data portion 104 are needed to meet a level of availability, redundancy and/or durability. Accordingly, the placement component 106 can disseminate three replicas to three nodes in the set of storage nodes 108. Similar to the replication component 102, the placement component 106 can render placement decisions based upon evaluated characteristics of storage nodes 108. The placement component 106 can select one or more nodes from storage nodes 108 to retain replicas. By way of example, the placement component 106 can select a storage location that is near the client machine to retain a replica of the new backup version to facilitate faster retrieval that conserves network bandwidth upon restore.

It is to be appreciated that system 100 can include any suitable and/or necessary interface components (not shown), which provides various adapters, connectors, channels, communication paths, etc. to integrate the replication component 102 and the placement component 106, into virtually any application, operating and/or database system(s) and/or with one another. In addition, the interface components can provide various adapters, connectors, channels, communication paths, etc., that provide for interaction with and between the replication component 102, the placement component 106, storage nodes 108 and/or component associated with system 100.

Figure 2:
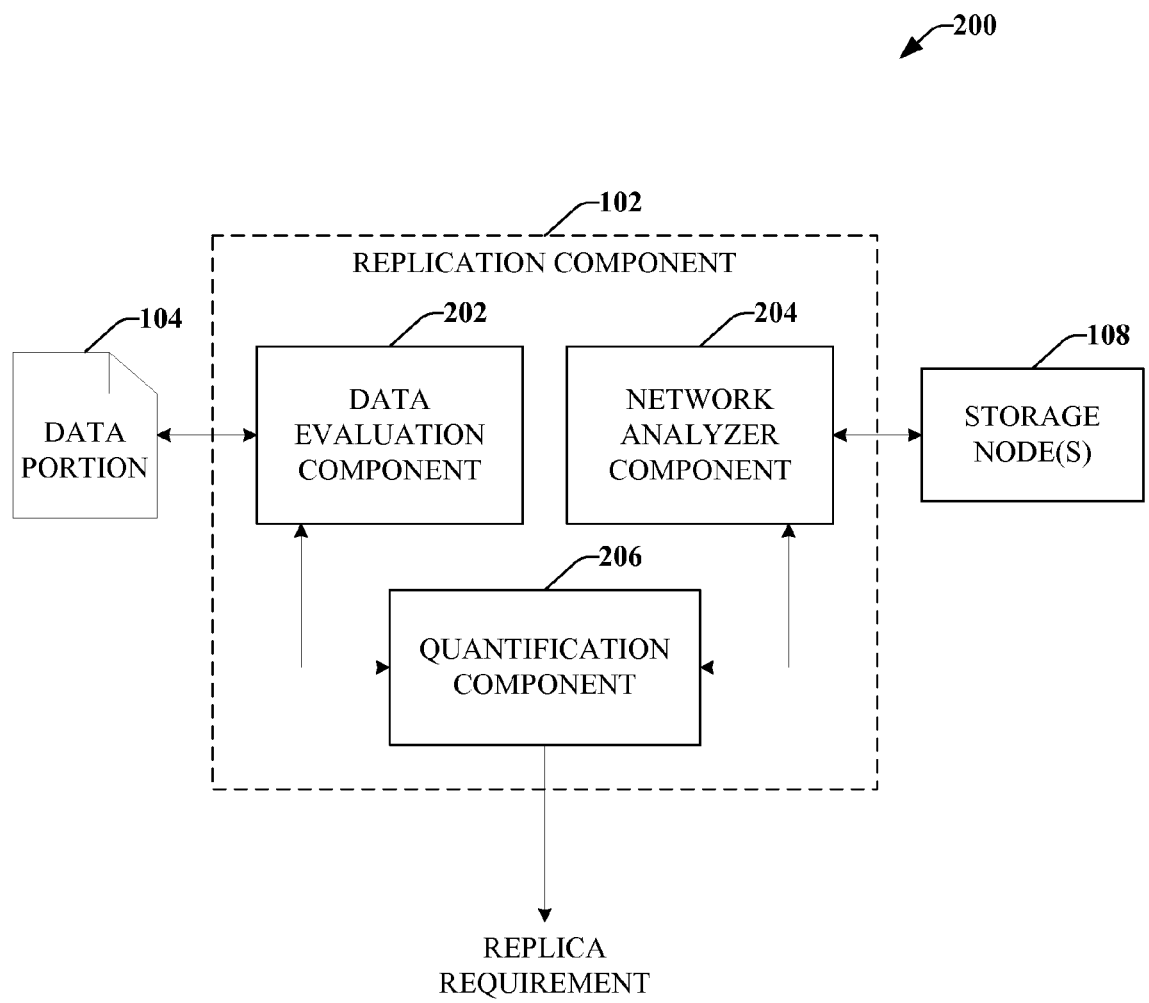
FIG. 2 illustrates a block diagram of an example system that facilitates generating a replica requirement in accordance with various aspects.

Turning now to FIG. 2, a system 200 is illustrated that facilitates generating a replica requirement in accordance with various aspects. As FIG. 2 illustrates, system 200 can include a replication component 102, which can create a replica requirement (e.g., a number of copies needed to ensure availability and/or reliability of data storage) based upon characteristics of storage locations and/or data. In one example, a portion of data 104 can be provided to the replication component 102, wherein the replication component 102 can determine a replica requirement associated with the data portion 104.

In accordance with an aspect, the replication component 102 can analyze data portion 104 to facilitate determination of the replica requirement. In particular, the replication component 102 can utilize a data evaluation component 202 to inspect properties of the data portion 104 that can affect a number of copies required and/or possible. In one example, the data evaluation component 202 can ascertain a size of the data portion 104. In another example, the data evaluation component 202 can evaluate the data portion 104 to determine whether the data portion 104 can be compressed and/or segmented to reduce storage impact on an individual storage node. For instance, a data portion 104 can be partitioned into segments (e.g., chunks, blocks, etc.) such that respective chunks can be distributed individually to different storage nodes. Such segmentation can enhance reliability while reducing the replica requirement as greater diversification of storage nodes can be achieved without a relative increase in storage costs. In addition, the data evaluation component 202 can ascertain any licenses (e.g., digital rights management) attached to the data portion 104. Moreover, the data evaluation component 202 can analyze licenses for terms that prohibit and/or restrain replication, segmentation or other data manipulations.

According to an additional aspect, placement component 102 can include a network analyzer component 204, which can analyze a computing network associated with system 200 as well as analyze storage nodes 108. The network analyzer component 204 can identify characteristics of storage nodes such that the identified characteristics can facilitate deciding a replica requirement. The characteristics can include availability of storage nodes (e.g., based on device activity levels, powered-on or powered-off status, etc.), available storage space at nodes, cost of storage at nodes, cost of data transfer to/from nodes, network locality of nodes, and the like. The characteristics can facilitate, for example, balancing availability of various data with optimal locality.

In accordance with another aspect, the replication component 102 can include a quantification component 206 that generates a replica requirement for data portion 104 based at least in part on results provided by the data evaluation component 202 and/or network analyzer component 204. For instance, the quantification component 206 can utilize information acquired through evaluation of data portion 104 to generate a requirement. In one example, the quantification component 206 can reduce a replica requirement when data portion 104 is large (e.g., consumes a large amount of storage resources) in order to balance availability and storage costs. In another example, the quantification component 206 can similarly reduce the requirement for data portions that are separable. With data portions capable of being segmented, availability can be increased through greater diversification of storage nodes while maintaining a level of storage utilization. In addition, the quantification component 206 can consider limitations on replication imposed by licensing or other digital rights management.

The quantification component 206 can further generate a replica requirement based upon information obtained through analysis of storage nodes 108. In particular, the quantification component 206 can factor characteristics of the storage nodes 108 determined by the network analyzer component 204 when generating a replica requirement. The quantification component 206 can evaluate characteristics of storage nodes 108 individually and/or aggregate characteristics of available storage nodes 108. In one example, a lower replica requirement can be specified when availability of storage nodes 108 is high. In another example, a higher replica requirement can be indicated when storage capacity is abundant and/or cost of storage is low.

In accordance with another aspect, the quantification component 206 can employ statistical models based on machine learning and/or heuristics to facilitate intelligent, automated specification of a replica requirement for respective information. In particular, the quantification component 206 can employ models that incorporate, aggregate and/or utilize individual decisions of the quantification component 206 based upon information provided by the network analyzer component 204 and/or the data evaluation component 202. In one example, the quantification component 206 can utilize any suitable artificial intelligence (AI), machine learning, and/or other algorithm(s) generally known in the art. As used in this description, the term "intelligence" refers to the ability to reason or draw conclusions about, e.g., infer, the current or future state of a system based on existing information about the system. Artificial intelligence can be employed to identify a specific context or action, or generate a probability distribution of specific states of a system without human intervention. Artificial intelligence relies on applying advanced mathematical algorithms (e.g., decision trees, neural networks, regression analysis, cluster analysis, genetic algorithm, and reinforced learning) to a set of available data (information) on the system. For example, one or more of numerous methodologies can be employed for learning from data and then drawing inferences from the models so constructed, e.g., hidden Markov models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches (that perform data fusion, etc.) in accordance with implementing various automated aspects described herein.

Figure 3:
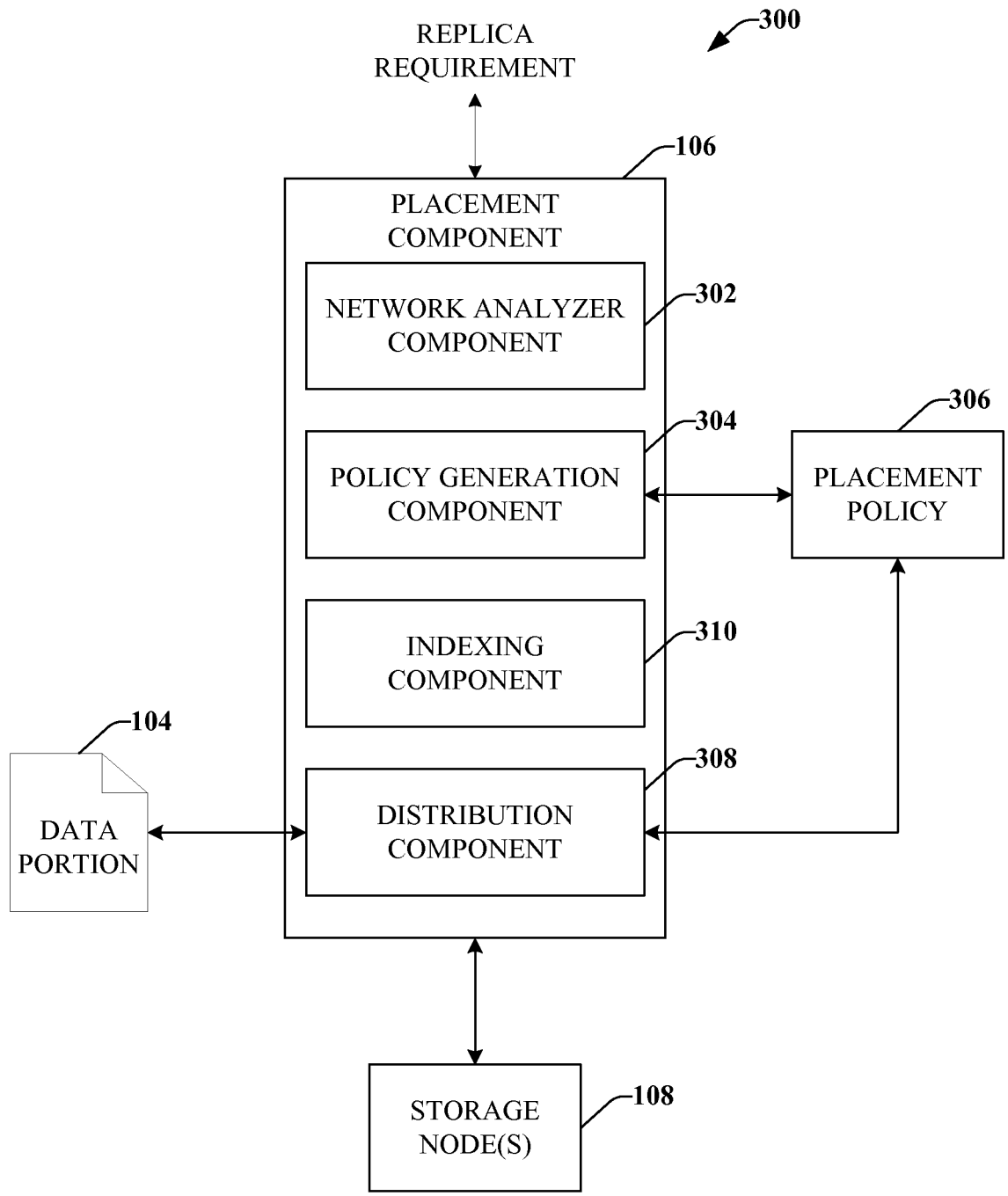
FIG. 3 illustrates a block diagram of an example system that facilitates distributing replicas of data across a set of storage nodes in accordance with one or more aspects.

FIG. 3 illustrates a system 300 distributing replicas of data across a set of storage nodes in accordance with one or more aspects. As FIG. 3 illustrates, system 300 can include a placement component 106 that can distribute copies of a data portion 104 among storage nodes 108 in accordance with a replica requirement. In one example, the replica requirement can be generated by a replication component such as replication component 102 as describe supra with reference to FIGS. 1 and 2.

In accordance with an aspect, the placement component 106 can include a network analyzer component 302, which can analyze a computing network associated with system 300 as well as analyze storage nodes 108. The network analyzer component 302 can identify characteristics of storage nodes such that the identified characteristics can facilitate deciding a replica requirement. The characteristics can include availability of storage nodes (e.g., based on device activity levels, powered-on or powered-off status, etc.), available storage space at nodes, cost of storage at nodes, cost of data transfer to/from nodes, network locality of nodes, and the like.

In another aspect, the placement component 106 can include a policy generation component 304 that utilizes the identified characteristics to generate a placement policy 306. The placement component 106 can additionally include a distribution component 308 that scatters replicas of data portion 104 to storage nodes 108 in accordance with the placement policy 306. In one example, the placement policy 306 specifies priorities of storage nodes such that the placement component 106 can initially attempt to place replicas of data portion 104 at higher priority nodes. For instance, the placement policy 306 can include listings of storage nodes that are prioritized or ranked, wherein a respective listing is provided for each characteristic identify by the network analyzer component 302.

In another example, the distribution component 308 can utilize an aggregation of priorities of a node across all characteristics. For instance, the distribution component 308 can statistically combine (e.g., average, heuristically combine, machine learning, or other statistical models) priorities of a node for each characteristic to derive a cumulative or overall priority. The distribution component 308 can replicate the data portion 104 to top ranked storage nodes up to a number specified in the replica requirement.

In another example, the distribution component 308 can utilize one or more criteria to select storage nodes in accordance with the placement policy 306. For instance, the distribution component 308 can employ one criterion such that a replica is stored at a storage node with highest availability. Accordingly, the distribution component 308 selects the storage node with a highest priority in terms of availability from the placement policy. It is to be noted without limitation or loss of generality that other criteria can be utilized by the distribution component 308. For example, another criterion can prefer a storage node with large storage capacity and/or an abundance of low cost storage. Accordingly, the distribution component 308 can select a storage node with highest priority in terms of storage capacity and/or storage cost.

It is to be appreciated that the placement policy 306 can be manually configured by a user in accordance with an aspect. For instance, a user can specify a preferred storage node within storage nodes 108 such that the distribution component 308 disperses a large amount of replicas to the preferred node. Moreover, the user can indicate a parameter that limits storage available to system 300 on storage nodes 108. In another example, the user can specify criteria preferences. For instance, the distribution component 308 can weight one characteristic (e.g., availability) higher than another characteristic (e.g., storage capacity) in accordance with a preference established by a user.

In accordance with another aspect, placement component 106 can include and/or otherwise be associated with an indexing component 310, which can maintain an index that lists relationships between replicas of data portion 104 and storage nodes to which the replicas have been distributed. In one example, the indexing component 310 can add, delete, and/or modify entries in the index when the distribution component 308 renders distribution decisions regarding replica placement. In another example, the index can be distributed along with replicas of data portion 104 among storage nodes 108. It is to be noted without limitation or loss of generality that an entire index can be replicated and stored at one or more nodes, or that an index can be divided and distributed, in chunks, among multiple nodes.

Although not depicted in FIG. 3, it is to be appreciated that system 300 can employ machine learning and reasoning (MLR) techniques to facilitate intelligent, automated selection of storage nodes for respective information. In one example, any suitable artificial intelligence (AI), machine learning, and/or other algorithm(s) generally known in the art can be employed. As used in this description, the term "intelligence" refers to the ability to reason or draw conclusions about, e.g., infer, the current or future state of a system based on existing information about the system. Artificial intelligence can be employed to identify a specific context or action, or generate a probability distribution of specific states of a system without human intervention. Artificial intelligence relies on applying advanced mathematical algorithms (e.g., decision trees, neural networks, regression analysis, cluster analysis, genetic algorithm, and reinforced learning) to a set of available data (information) on the system. For example, one or more of numerous methodologies can be employed for learning from data and then drawing inferences from the models so constructed, e.g., hidden Markov models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches (that perform data fusion, etc.) in accordance with implementing various automated aspects described herein.

Figure 4:
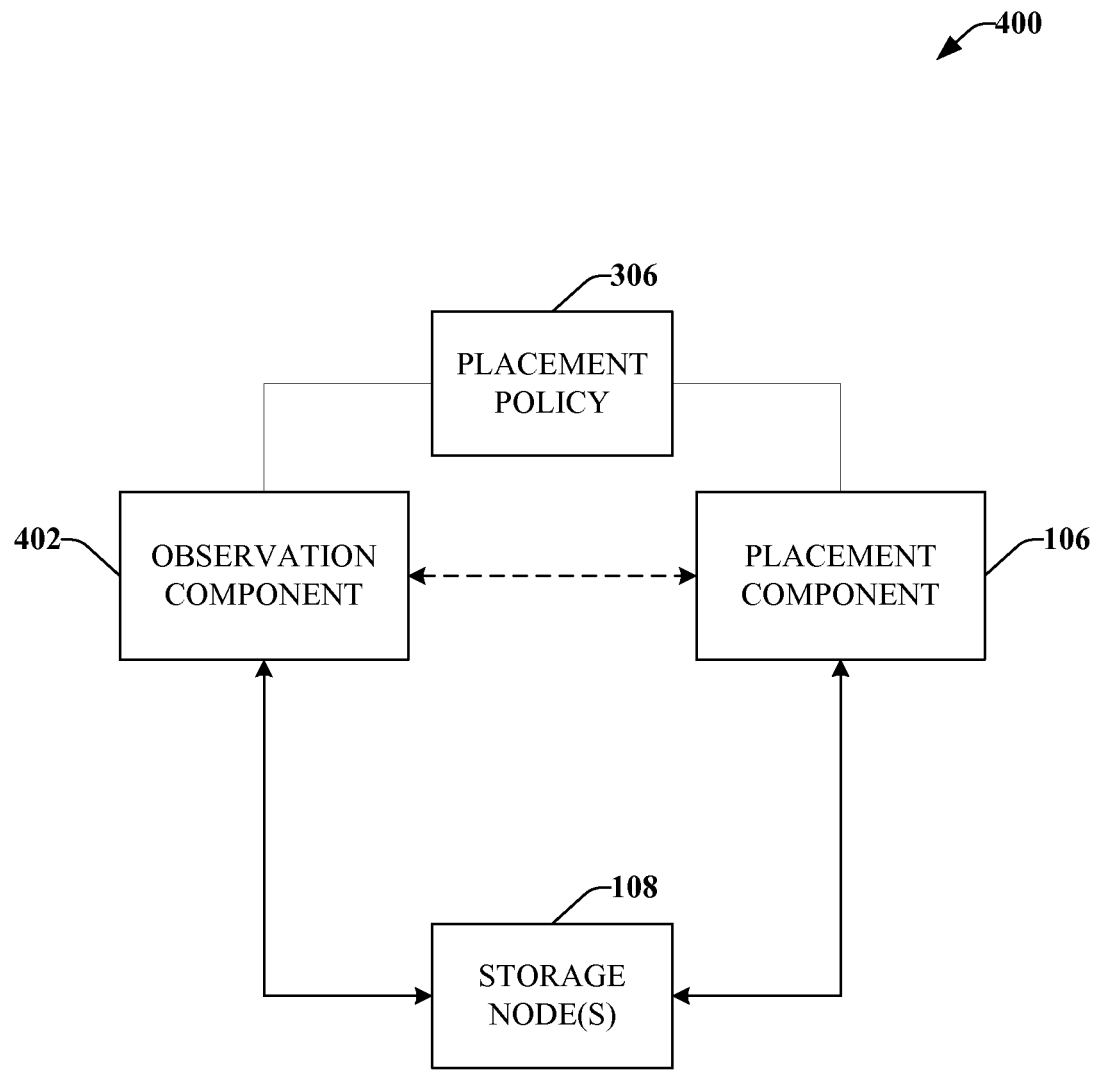
FIG. 4 illustrates a block diagram of an example system that facilitates monitoring storage nodes to dynamically distribute replicas in accordance with various aspects.

Referring to FIG. 4, illustrated is a system 400 that facilitates monitoring storage nodes to dynamically distribute replicas in accordance with various aspects. As depicted in FIG. 4, system 400 can include an observation component 402 that monitors a set of storage nodes 108. While observation component 402 is depicted in FIG. 4 separate from storage nodes 108, it is to be appreciated that the observation component 402 can include monitoring agents associated, respectively, with each storage node. The monitoring agents can be responsible for monitoring and reporting status of a respective storage node to which the agent is associated.

In accordance with an aspect, the observation component 402 can monitor storage nodes 108. In particular, the observation component 402 can track health, performance, available storage, available bandwidth, connectivity, overall availability, and/or availability of other resources of respective storage nodes 108. In addition, the observation component 402 can track characteristics identified by network analyzer components 204 and/or 302 described supra with reference to FIGS. 2 and 3, respectively. The observation component 402 can convey monitoring results to a placement component 106, which can efficiently reallocate information (e.g., replicas). In one example, placement component 106 can allocate more replicas to storage locations determined, by the observation component 402, to have higher available storage. In another example, the placement component 106 can distribute replicas among storage nodes 108 based upon monitoring data to achieve reliability and/or durability requirements. In an example, a particular storage node can optimal in terms of locality to a client machine. However, the storage node can exhibit low availability. Accordingly, the placement component 106 can select a secondary storage node to retain an additional replica. Such redundancy proves the client machine a guarantee that a replica of data will be available from some storage node, if not always the optimal location.

In accordance with another aspect, the placement component 106 can dynamically adjust distributions of replicas based upon monitor results. The observation component 402 can continuously communicate monitor results related to storage nodes 108 to the placement component 106. In turn, the placement component 106 can shift replicas around the storage nodes 108. In one example, the placement component 106 can increase redundancy, decrease redundancy, remove replicas from a node nearing storage capacity, allocating additional replicas to a node with increased storage availability, and the like.

Figure 5:
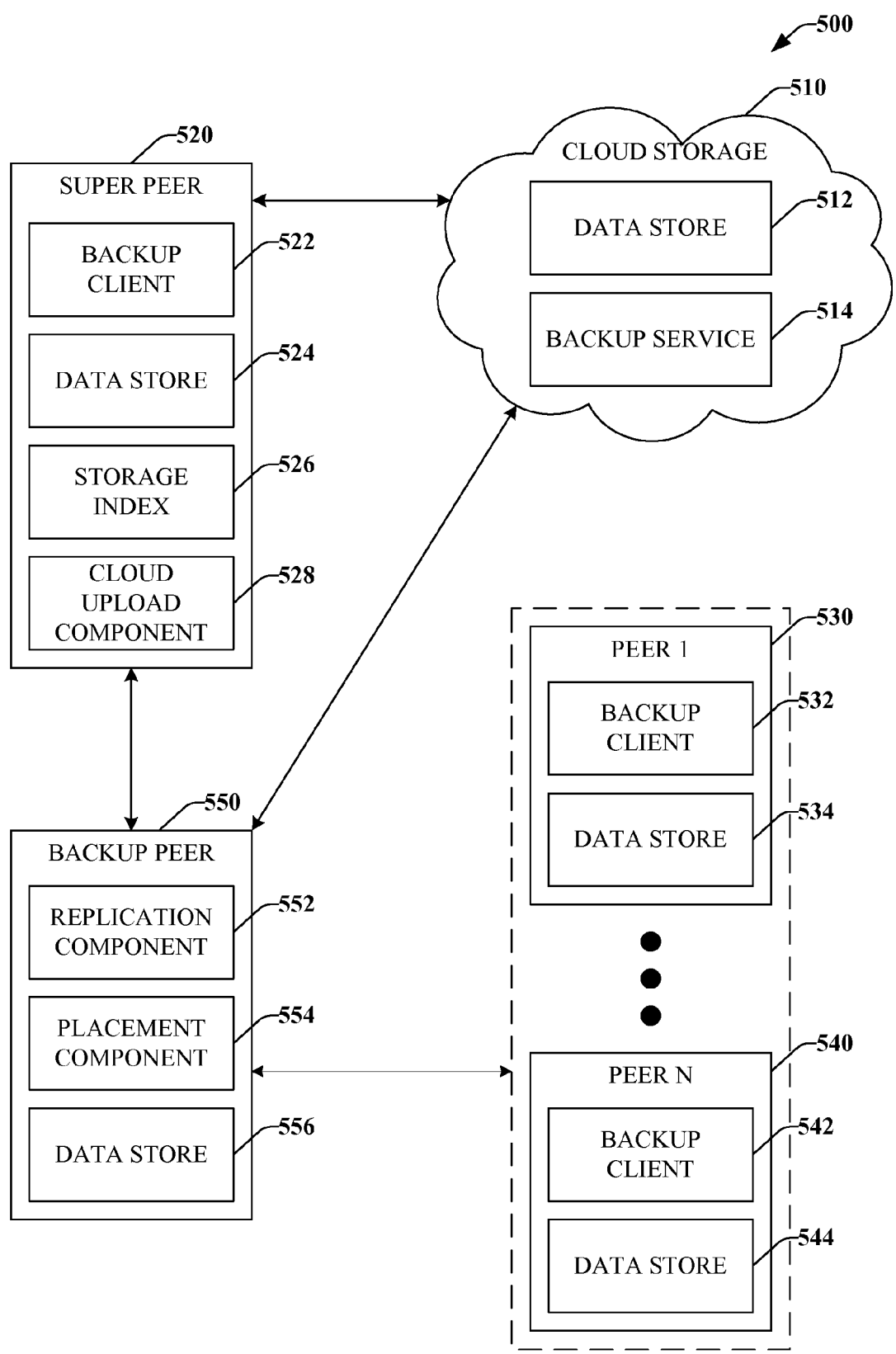
FIG. 5 illustrates a block diagram of an example network implementation that can be utilized in connection with various aspects described herein.

Referring next to FIG. 5, a diagram 500 is provided that illustrates an example network implementation that can be utilized in connection with various aspects described herein. As diagram 500 illustrates, a network implementation can utilize a hybrid peer-to-peer and cloud-based structure, wherein a cloud service provider 510 interacts with one or more super peers 520 and one or more peers 530-540. The network implementation illustrated in FIG. 5 can utilize a distributed storage system as described supra with reference to previous figures to implement a hybrid peer-to-peer/cloud based backup architecture.

In accordance with one aspect, cloud service provider 510 can be utilized to remotely implement one or more computing services from a given location on a network/internetwork associated with super peer(s) 520 and/or peer(s) 530-540 (e.g., the Internet). Cloud service provider 510 can originate from one location, or alternatively cloud service provider 510 can be implemented as a distributed Internet-based service provider. In one example, cloud service provider 510 can be utilized to provide backup functionality to one or more peers 520-540 associated with cloud service provider 510. Accordingly, cloud service provider 510 can implement a backup service 512 and/or provide associated data store 514.

In one example, data storage 514 can interact with a backup client 522 at super peer 520 and/or backup clients 532 or 542 at respective peers 530 or 540 to serve as a central storage location for data residing at the respective peer entities 520-540. In this manner, cloud service provider 510, through data storage 514, can effectively serve as an online "safe-deposit box" for data located at peers 520-540. It can be appreciated that backup can be conducted for any suitable type(s) of information, such as files (e.g., documents, photos, audio, video, etc.), system information, or the like. Additionally or alternatively, distributed network storage can be implemented, such that super peer 520 and/or peers 530-540 are also configured to include respective data storage 524, 534, and/or 544 for backup data associated with one or more machines on the associated local network. In another example, techniques such as de-duplication, incremental storage, and/or other suitable techniques can be utilized to reduce the amount of storage space required by data storage 514, 524, 534, and/or 544 at one or more corresponding entities in the network represented by diagram 500 for implementing a cloud-based backup service.

In accordance with another aspect, cloud service provider 510 can interact with one or more peer machines 520, 530, and/or 540. As illustrated in diagram 500, one or more peers 520 can be designated as a super peer and can serve as a liaison between cloud service provider 510 and one or more other peers 530-540 in an associated local network. While not illustrated in FIG. 5, it should be appreciated that any suitable peer 530 and/or 540, as well as designated super peer(s) 520, can directly interact with cloud service provider 510 as deemed appropriate. Thus, it can be appreciated that cloud service provider 510, super peer(s) 520, and/or peers 530 or 540 can communicate with each other at any suitable time to synchronize files or other information between the respective entities illustrated by diagram 500.

In one example, super peer 520 can be a central entity on a network associated with peers 520-540, such as a content distribution network (CDN), an enterprise server, a home server, and/or any other suitable computing device(s) determined to have the capability for acting as a super peer in the manners described herein. In addition to standard peer functionality, super peer(s) 520 can be responsible for collecting, distributing, and/or indexing data among peers 520-540 in the local network. For example, super peer 520 can maintain a storage index 526, which can include the identities of respective files and/or file segments corresponding to peers 520-540 as well as pointer(s) to respective location(s) in the network and/or in cloud data storage 514 where the files or segments thereof can be found. Additionally or alternatively, super peer 520 can act as a gateway between other peers 530-540 and a cloud service provider 510 by, for example, uploading respective data to the cloud service provider 510 at designated off-peak periods via a cloud upload component 528.

In another aspect, a backup peer 550 is provided that can backup a file, or other information to the peers 530 and 540, super peer 520 and/or the cloud 510. In one example, a file or portion of data can be distributed among the cloud 510, super peer 520 and/or one or more peers 530-540 such that replicas of the file or portion of data is stored at one or more locations. The backup peer 550 can include a replication component 552 that can generate a replica requirement (e.g., a number of replicas needed to be stored). The replication component can analyze a file or portion of data retained in data store 556 as well as identify characteristics of peers 530-540, super peer 520, and cloud 510. Based upon the analysis, the replication component 552 can determine a suitable replica requirement for the file or portion of data.

The backup peer 550 can further include a placement component 554 that selects one or more storage nodes to store a replica of the file or portion of data. The storage nodes can include the cloud 510, super peer 520 and/or the peers 530-540. In one example, the placement component 554 can render placement decisions in accordance with a placement policy derived from characteristics assigned to storage nodes.

It is to be appreciated that the data stores illustrated in system 500 (e.g., data stores 514, 522, 532, 542, and 556) can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store of the subject systems and methods is intended to comprise, without being limited to, these and any other suitable types of memory. In addition, it is to be appreciated that the data stores can be a server, a database, a hard drive, a pen drive, an external hard drive, a portable hard drive, and the like.

Figure 6:
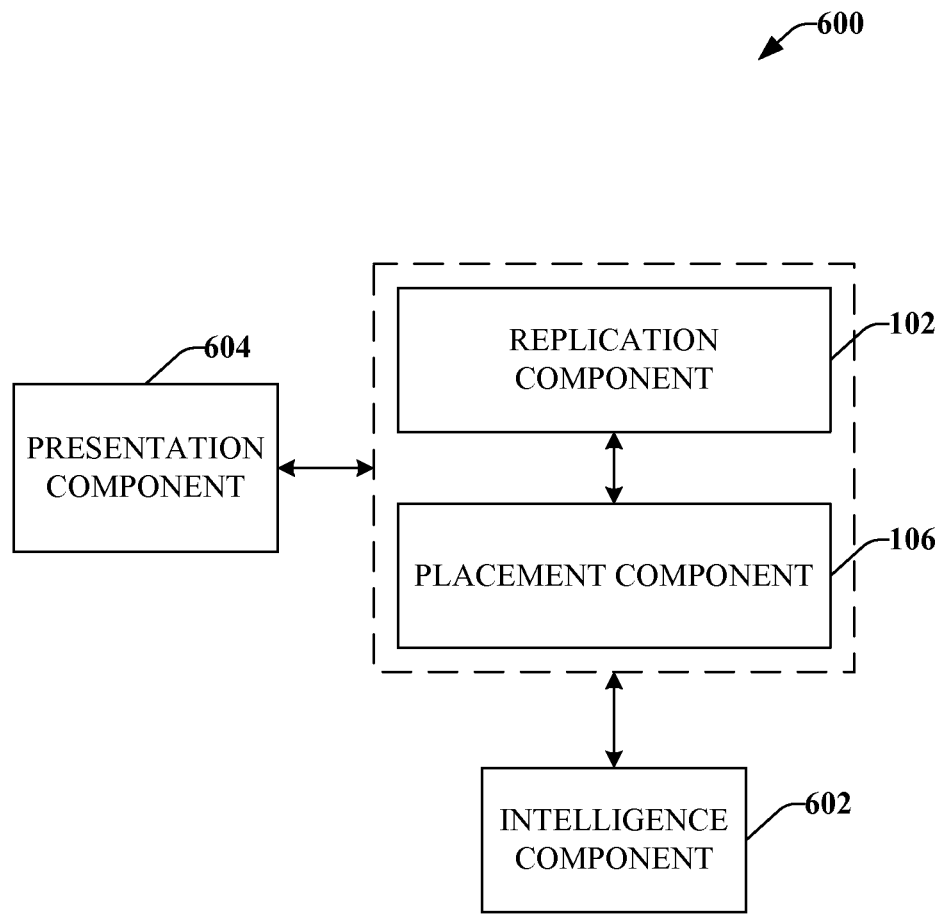
FIG. 6 illustrates a block diagram of an example system that facilitates generating and distributing data replicas in accordance with various aspects.

FIG. 6 illustrates a system 600 that generating and distributing data replicas in accordance with various aspects. The system 600 can include the replication component 102 and placement component 106 which can be substantially similar to respective components, boxes, systems and interfaces described in previous figures. The system 600 further includes an intelligence component 602. The intelligence component 602 can be utilized by the replication component 102 and/or the placement component 106 to infer, for example, characteristics of storage nodes, properties of a portion of data, optimal placements of replicas, a replica requirement of a portion of data, and the like.

The intelligence component 602 can employ value of information (VOI) computation in order to identify appropriate storage nodes to achieve optimal allocations of replicas. For instance, by utilizing VOI computation, the most ideal and/or appropriate replica allocations can be determined. Moreover, it is to be understood that the intelligence component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The replication component 102 and/or the placement component 106 can further utilize a presentation component 604 that provides various types of user interfaces to facilitate interaction between a user and any component coupled to system 600 (e.g., storage nodes, replication components, placement components, placement policies, backup clients, backup service, etc.). As depicted, the presentation component 604 is a separate entity that can be utilized with the replication component 102 and the placement component 106. However, it is to be appreciated that the presentation component 604 and/or similar view components can be incorporated into the replication component 102, the placement component 106 and/or a stand-alone unit. The presentation component 604 can provide one or more graphical user interfaces (GUIs), command line interfaces, and the like. For example, a GUI can be rendered that provides a user with a region or means to load, import, read, edit etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the replication component 102 and/or the placement component 106 to indicate preferences for the generation, number and placement of replicas.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
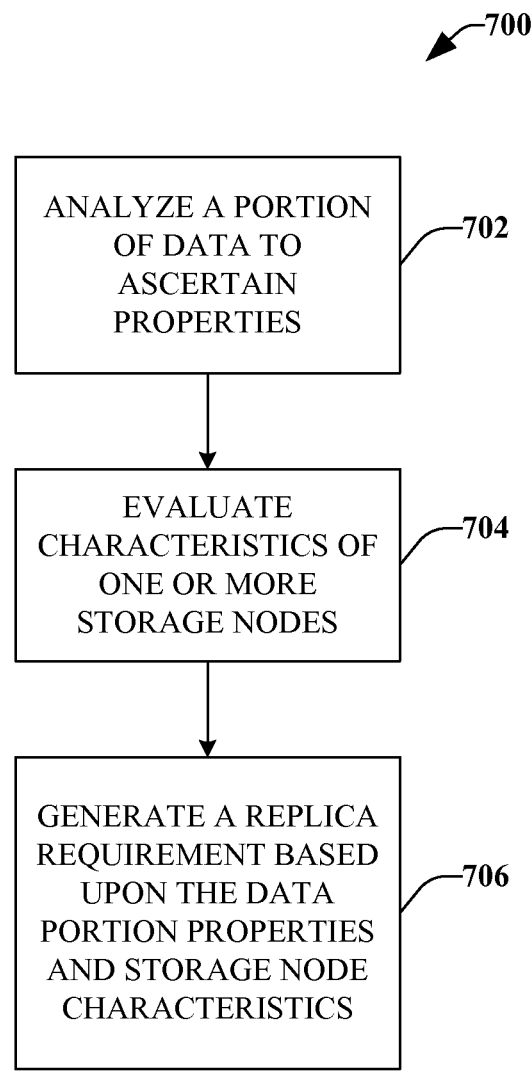
FIG. 7 illustrates an exemplary methodology for generating a replica requirement of a portion of data to be stored in a distributed file system in accordance with various aspects.
Figure 8:
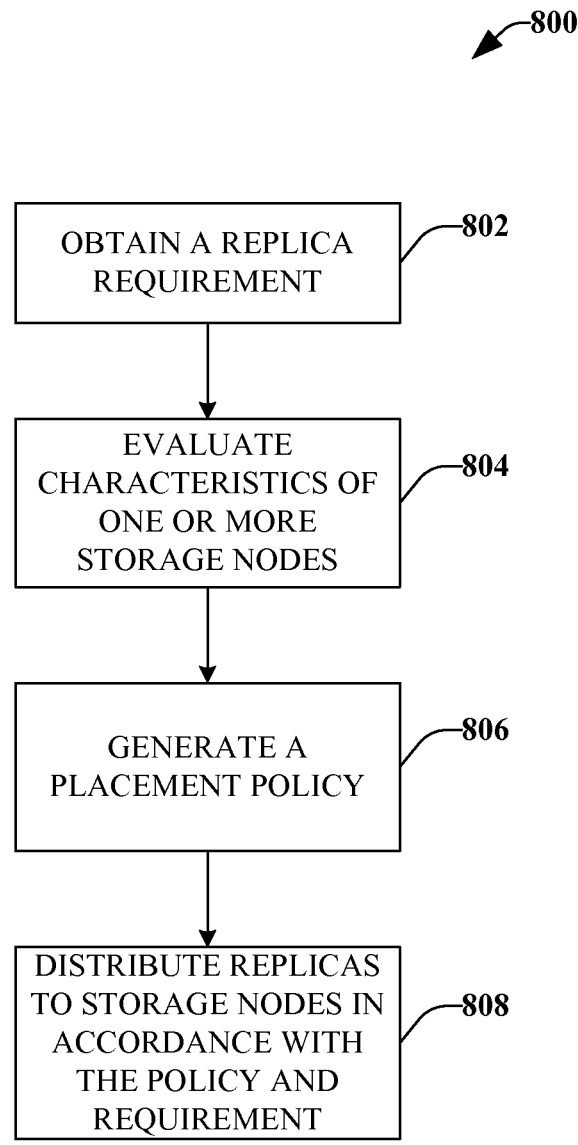
FIG. 8 illustrates an exemplary methodology for distributing replicas of a portion of data among storage nodes in accordance with various aspects.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring to FIG. 7, a method 700 for generating a replica requirement of a portion of data to be stored in a distributed file system is illustrated. At reference numeral 702, a portion of data is analyzed to ascertain properties. The properties can include storage size of the portion of data, whether the portion of data can be compressed and/or segmented to reduce storage, or other suitable properties. In addition, the portion of data can be analyzed for licensing terms (e.g., digital rights management) that can limit or otherwise affect a number of replica copies available. At reference numeral 704, one or more storage nodes can be evaluated to ascertain characteristics of the nodes. In an example, characteristics of a storage node can include features such as, but not limited to, availability of the storage node, storage capacity of the storage node, cost of storage on the storage nodes, cost of transfer to/from the storage node, network proximity and/or locality of the storage node relative to an origin node, and network topology and so on. At reference numeral 706, a replica requirement can be generated. The replica requirement specifies a number of replicas to be distributed among one or more storage nodes. In one example, the replica requirement can be based the properties of the portion of data. In another example, the replica requirement can be generated in accordance with the evaluated characteristics of the storage nodes.

Turning now to FIG. 8, a method 800 for distributing replicas of a portion of data among storage nodes is illustrated. At reference numeral 802, a replica requirement can be obtained. The replica requirement indicates a number of replicas to disperse among one or more storage nodes. At reference numeral 804, characteristics of the one or more storage nodes are evaluated. At reference numeral 806, the characteristics can be employed to generate a placement policy. The placement policy specifies priorities of storage nodes such that replicas can be placed at higher priority nodes. For instance, the placement policy can include listings of storage nodes that are prioritized or ranked, wherein a respective listing is provided for each characteristic. At reference numeral 808, replicas can be distributed to storage nodes in accordance with the policy and/or the replica requirement.

Figure 9:
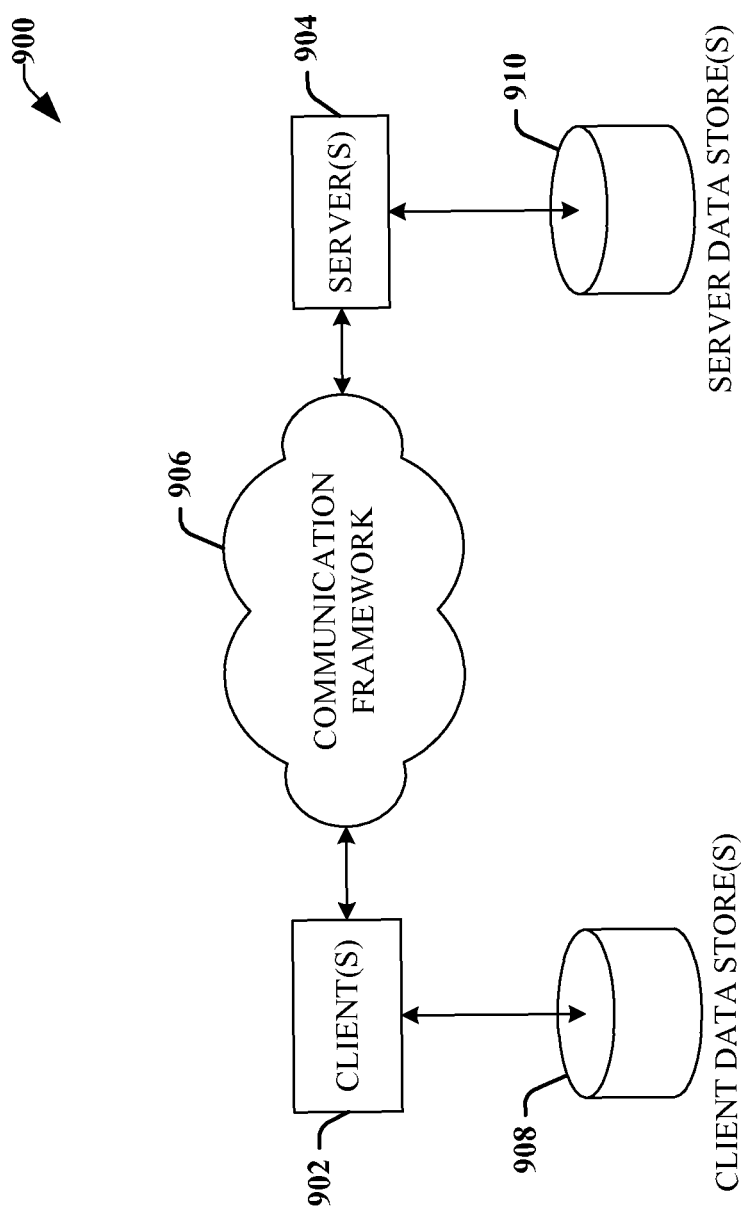
FIG. 9 illustrates an exemplary networking environment, wherein the novel aspects of the claimed subject matter can be employed.
Figure 10:
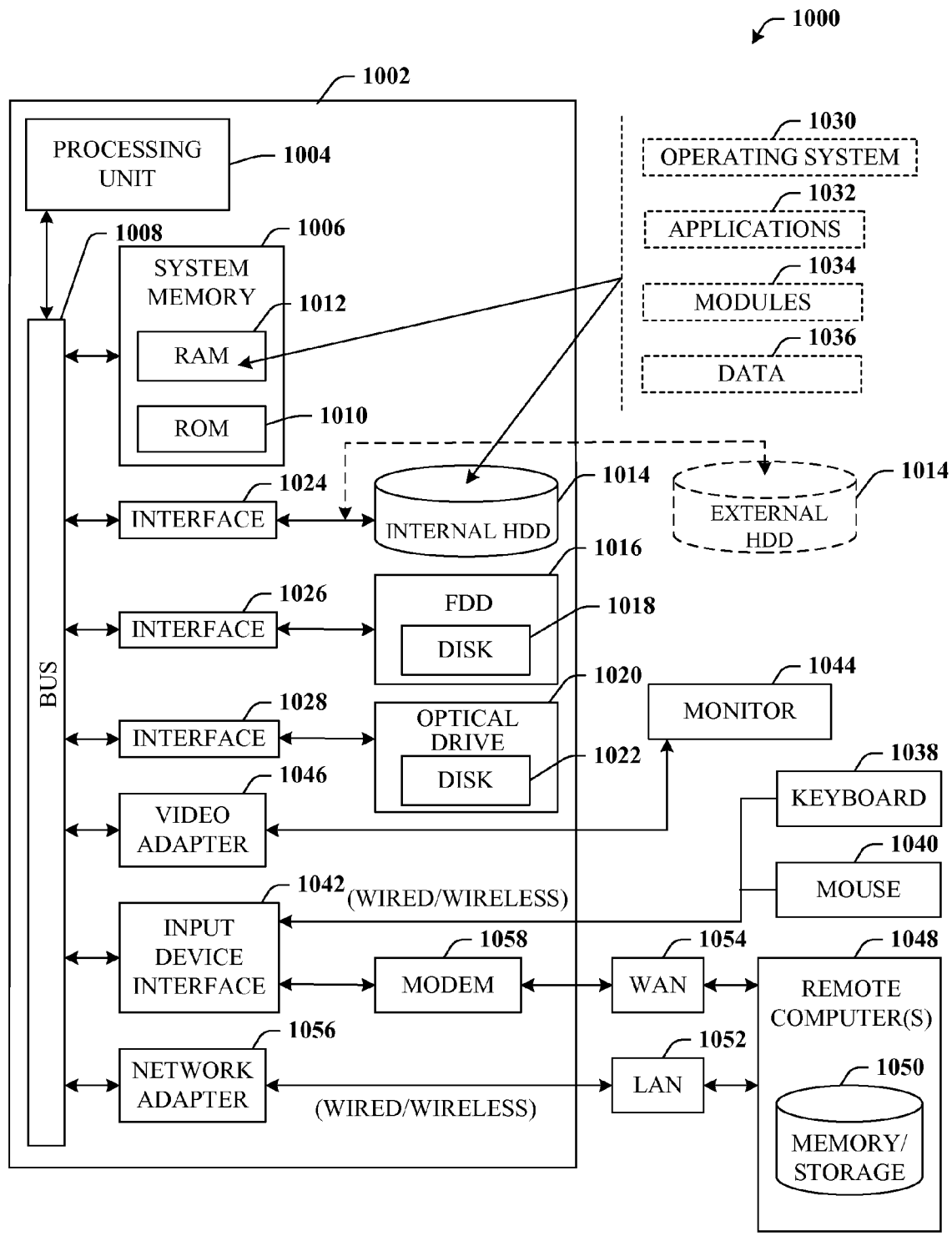
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, client machines such as peers and super-peers, as well as cloud storage locations can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Generally, program modules include routines, programs, components, data structures, etc., that perform particular tasks or implement particular abstract data types. Moreover, those skilled in the art will appreciate that the claimed subject matter can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Referring now to FIG. 9, there is illustrated a schematic block diagram of an exemplary computer compilation system operable to execute the disclosed architecture. The system 900 includes one or more client(s) 902. The client(s) 902 can be hardware and/or software (e.g., threads, processes, computing devices). In one example, the client(s) 902 can house cookie(s) and/or associated contextual information by employing one or more features described herein.

The system 900 also includes one or more server(s) 904. The server(s) 904 can also be hardware and/or software (e.g., threads, processes, computing devices). In one example, the servers 904 can house threads to perform transformations by employing one or more features described herein. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

With reference to FIG. 10, an exemplary environment 1000 for implementing various aspects described herein includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE-1394 interface technologies. Other external drive connection technologies are within contemplation of the subject disclosure.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the claimed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, a serial port, an IEEE-1394 port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, is a wireless technology similar to that used in a cell phone that enables a device to send and receive data anywhere within the range of a base station. Wi-Fi networks use IEEE-802.11 (a, b, g, etc.) radio technologies to provide secure, reliable, and fast wireless connectivity. A Wi-Fi network can be used to connect computers to each other, to the Internet, and to wired networks (which use IEEE-802.3 or Ethernet). Wi-Fi networks operate in the unlicensed 2.4 and 5 GHz radio bands, at an 13 Mbps (802.11a) or 54 Mbps (802.11b) data rate, for example, or with products that contain both bands (dual band). Thus, networks using Wi-Fi wireless technology can provide real-world performance similar to a 10 BaseT wired Ethernet network.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the described aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates allocation of replicas among a set of storage nodes in a hybrid backup environment, the hybrid backup environment including one or more storage nodes located in a cloud storage location of a cloud backup environment, one or more storage nodes located in a peer-to-peer backup environment and one or more peers of the peer-to-peer backup environment, the system comprising:
a processor coupled to a memory that retains computer-executable instructions, wherein the processor executes:
(A) a replication component that:
identifies properties of a portion of data,
evaluates both the one or more storage nodes located in the cloud storage location of the cloud backup environment and the one or more storage nodes located in the peer-to-peer backup environment to identify characteristics of the one or more storage nodes located in the cloud storage location of the cloud backup environment and the one or more storage nodes located in the peer-to-peer backup environment,
wherein the one or more storage nodes located in the cloud storage location and the one or more storage nodes located in the peer-to-peer backup environment are disjoint sets; and wherein the one or more peers of the peer-to-peer backup environment consist of one or more devices and the cloud storage location is accessible to the one or more devices via a network, the cloud storage interacting with the one or more peers via the network, and
generates a replica requirement for the portion of data based at least in part on an analysis of (1) the identified properties of the portion of data and (2) the identified characteristics of both the one or more storage nodes located in the cloud storage location of the cloud backup environment and the one or more storage nodes located in the peer-to-peer backup environment, the one or more storage nodes located in the cloud storage location and the one or more storage nodes located in the peer-to-peer backup environment being disjoint sets; wherein the identified properties include the size of the portion of data and at least one of: compressibility of the portion of data and reparability of the portion of data; and
(B) a placement component that:
generates a placement policy based, at least in part on (1) the identified characteristics of the one or more storage nodes located in the cloud storage location of the cloud backup environment and the identified characteristics of the one or more storage nodes located in the peer-to-peer backup environment, the one or more storage nodes located in the cloud storage location and the one or more storage nodes located in the peer-to-peer backup environment being disjoint sets, the identified characteristics including one or more of: availability of a storage node, available storage capacity of the storage node, cost of storage corresponding to the storage node, cost of data transfer to or from the storage node, and network locality of the storage node relative to an origin node, and (2) user preferences, comprising (i) a weighting of: each one of the identified characteristics of the one or more storage nodes located in the cloud storage location of the cloud backup environment and the identified characteristics of the one or more storage nodes located in the peer-to-peer backup environment used in generating the placement policy, the one or more storage nodes located in the cloud storage location and the one or more storage nodes located in the peer-to-peer backup environment being disjoint sets, and (ii) an identification of a preferred storage node; and
distributes one or more replicas of the portion of data among both the one or more storage nodes located in the cloud storage location of the cloud backup environment and the one or more storage nodes located in the peer-to-peer backup environment of the hybrid backup environment, based on the replica requirement, the placement policy, the identified characteristics of the one or more storage nodes located in the cloud storage location of the cloud backup environment, and the identified characteristics of the one or more storage nodes located in the peer-to-peer backup environment, the one or more storage nodes located in the cloud storage location and the one or more storage nodes located in the peer-to-peer backup environment being disjoint sets,
(C) an observation component that monitors the one or more storage nodes located in the cloud backup environment and the one or more storage nodes located in the peer-to-peer backup environment to identify changes in the characteristics thereof.

2. The system of claim 1, wherein the properties of the portion of data include compressibility of the portion of data.

3. The system of claim 1, wherein the properties of the portion of data include reparability of the portion of data.

4. The system of claim 1, wherein the properties of the portion of data further include licensing restrictions on the portion of data.

5. The system of claim 1, wherein the analysis of the identified properties of the portion of data and the identified characteristics of the one or more storage nodes located in the cloud storage location of the cloud backup environment and the identified characteristics of the one or more storage nodes located in the peer-to-peer backup environment employs statistical models based upon at least one of machine learning or heuristics.

6. The system of claim 1, wherein the placement policy specifies a ranking of storage nodes, and wherein the placement component gives priority to higher ranking storage nodes when distributing replicas.

7. The system of claim 1, wherein the placement component includes a cataloguing component that maintains an index listing relationships between replicas of the portion of data and storage nodes to which the replicas have been distributed, and wherein the placement component at least one of adds, deletes, or modifies entries in the index when replica distribution decisions are rendered by the placement component.

8. The system of claim 1, wherein the placement component dynamically adjusts distribution of replicas based upon monitor results continuously communicated by the observation component.

9. The system of claim 1, wherein the replication component utilizes one of the one or more user preferences to generate the replica requirement and the placement component utilizes one of the one or more user preferences to distribute replicas.

10. The system of claim 1, wherein the placement component distributes replicas through application of a higher level of preference on the one or more storage nodes located in the peer-to-peer backup environment than to the one or more storage nodes located in the cloud storage location of the cloud backup environment.

11. A method for replicating data across one or more storage locations in a hybrid backup environment, the hybrid backup environment including one or more storage nodes located in a cloud storage location of a cloud backup environment, one or more storage nodes located in a peer-to-peer backup environment and one or more peers of the peer-to-peer backup environment, the method comprising:
  employing a processor executing computer-executable instructions stored on a computer-readable storage device that retains computer-executable instructions, to implement the following acts:
  assigning characteristics to both the one or more storage nodes located in the cloud storage location of the cloud backup environment and the one or more storage nodes located in the peer-to-peer backup environment, the one or more storage nodes located in the cloud storage location and the one or more storage nodes located in the peer-to-peer backup environment being disjoint sets;
    wherein the one or more peers of the peer-to-peer backup environment consist of one or more devices and the cloud storage location is accessible to the one or more devices via a network;
  identifying properties of a portion of data, wherein the identified properties include the size of the portion of data and at least one of: compressibility of the portion of data and reparability of the portion of data,
  specifying a replica requirement for the portion of data based at least in part on (1) an analysis of the identified properties of the portion of data and (2) the assigned characteristics of both the one or more storage nodes located in the cloud storage location of the cloud backup environment and the one or more storage nodes located in the peer-to-peer backup environment, the one or more storage nodes located in the cloud storage location and the one or more storage nodes located in the peer-to-peer backup environment being disjoint sets;
  generating a placement policy based, at least in part on (1) each one or the assigned characteristics of the one or more storage nodes located in the cloud storage location of the cloud backup environment and the identified characteristics of the one or more storage nodes located in the peer-to-peer backup environment, the one or more storage nodes located in the cloud storage location of the one or more storage nodes located in the peer-to-peer backup environment being disjoint sets, and (2) a user preference,
    the assigned characteristics including one or more of: availability of a storage node, available storage capacity of the storage node, cost of storage corresponding to the storage node, cost of data transfer to or from the storage node, and network locality of the storage node relative to an origin node, and
    wherein the user preference comprises (i) a weighting of each one of the assigned characteristics of both the one or more storage nodes located in the cloud storage location of the cloud backup environment and the one or more storage nodes located in the peer-to-peer backup environment used in generating the placement policy, the one or more storage nodes located in the cloud storage location and the one or more storage nodes located in the peer-to-peer backup environment being disjoint sets, and (ii) an identification of a preferred storage node; and
  placing one or more replicas of the portion of data on both the one of the one or more storage nodes located in the cloud storage location of the cloud backup environment and the one or more storage nodes located in the peer-to-peer backup environment of the hybrid backup environment, based on the replica requirement, the placement policy, the assigned characteristics of the one or more storage nodes located in the cloud storage location of the cloud backup environment, and the assigned characteristics of the one or more storage nodes located in the peer-to-peer backup environment, the one or more storage nodes located in the cloud storage location and the one or more storage nodes located in the peer-to-peer backup environment being disjoint sets, wherein the cloud storage interacts with the one or more peers of the peer-to-peer backup environment, via the network, and
  monitoring the one or more storage nodes located in the cloud backup environment and the one or more storage nodes located in the peer-to-peer backup environment to detect changes in the characteristics thereof and assigning the changed characteristics thereto.

* * * * *